(12) United States Patent
Jolivet (10) Patent No.: US 8,452,330 B2
(45) Date of Patent: May 28, 2013

(54) MOBILE TERMINAL AND METHOD FOR PROVIDING TERMINAL RELATED INFORMATION IN POWER-OFF STATE

(75) Inventor: Paul Jolivet, Paris (FR)

(73) Assignee: LG Electronics Inc., Seoul (KR)

( * ) Notice: Subject to any disclaimer, the term of this patent is extended or adjusted under 35 U.S.C. 154(b) by 227 days.

(21) Appl. No.: 12/744,123

(22) PCT Filed: Dec. 18, 2008

(86) PCT No.: PCT/KR2008/007512
§ 371 (c)(1),
(2), (4) Date: May 21, 2010

(87) PCT Pub. No.: WO2009/082126
PCT Pub. Date: Jul. 2, 2009

(65) Prior Publication Data
US 2010/0248783 A1    Sep. 30, 2010

Related U.S. Application Data

(60) Provisional application No. 61/016,341, filed on Dec. 21, 2007.

(51) Int. Cl.
*H04B 1/38*    (2006.01)

(52) U.S. Cl.
USPC ....... 455/558; 455/574; 455/550.1; 455/41.2; 455/343.1

(58) Field of Classification Search
USPC .............. 455/44.2, 550.1, 558, 41.1, 41.2, 455/41.3, 343.1, 343.5, 574, 571, 572.1, 455/127.5, 573
See application file for complete search history.

(56) References Cited

U.S. PATENT DOCUMENTS

| | | | |
|---|---|---|---|
| 7,003,319 B1 * | 2/2006 | Howell et al. | 455/558 |
| 2005/0207562 A1 | 9/2005 | Nachef et al. | |
| 2007/0150691 A1 * | 6/2007 | Illendula et al. | 711/170 |
| 2007/0235539 A1 * | 10/2007 | Sevanto et al. | 235/451 |
| 2007/0243901 A1 | 10/2007 | Cho | |
| 2008/0061945 A1 * | 3/2008 | Hoshina | 340/10.51 |
| 2008/0207124 A1 * | 8/2008 | Raisanen et al. | 455/41.2 |

FOREIGN PATENT DOCUMENTS

EP    1132839 A1    9/2001

* cited by examiner

*Primary Examiner* — Anthony S. Addy
*Assistant Examiner* — Khalid Shaheed
(74) *Attorney, Agent, or Firm* — Birch, Stewart, Kolasch & Birch, LLP (57) ABSTRACT

A mobile terminal and method for providing terminal related information in a power-off state of the terminal are discussed. According to an embodiment, the mobile terminal includes at least one storage unit; and a contactless controller configured to receive a request for information related to the mobile terminal from a requesting device in the power-off state, to obtain the requested information from the storage unit in the power-off state, and to transmit the obtained information to the requesting device in the power-off state.

5 Claims, 5 Drawing Sheets

MOBILE TERMINAL AND METHOD FOR PROVIDING TERMINAL RELATED INFORMATION IN POWER-OFF STATE

TECHNICAL FIELD

The present invention relates to a mobile terminal and method for providing information related to the mobile terminal to external devices in a power-off state of the mobile terminal.

BACKGROUND ART

Technologies associated with mobile terminals are being rapidly developed and standardized, and such technologies offer better and more sophisticated services and products to end users. In this regard, a variety of different external devices are available to connect to and interact with the mobile terminal in order to provide such services to the users.

Generally, if the mobile terminal is in the power-on state (i.e., the terminal is turned on), then an external device communicates with applicable components of the mobile terminal to implement the desired operations. Before the external device initiates a specific operation or service for the mobile terminal, the external device checks terminal profile information stored in the mobile terminal to determine if the mobile terminal has the necessary capabilities to accommodate the specific operation. In the power-on state of the mobile terminal, there is no problem for the external device to access the terminal profile information stored in the memory of the terminal since the memory is powered on. Although the terminal profile information is stored among many other information and data in the memory, the external device can access the terminal profile information in the power-on state without limitations.

For example, in order for the external device to implement a GPS application or banking operation with or through the mobile terminal, the external device first accesses terminal profile information from a memory of the mobile terminal and checks the capability of the mobile terminal to determine if the mobile terminal is capable of handling such operation. If the terminal is not capable of handling the operation, then the external device does not initiate a further action.

In many cases, the external device may desire to check the terminal profile information even when the mobile terminal is in the power-off state. That is, it would be desirable to have the terminal profile information accessible to external devices at any time. For example, before the mobile terminal is powered on, it may be desirable for an applicable external device to check the terminal profile information in advance, so that when the mobile terminal is turned on, the external device can immediately initiate or implement only the applicable operations with the mobile terminal without wasting time and other resources.

However, when the mobile terminal is in the power-off state, limited power from a battery may be supplied only to a keypad and clock management unit of the terminal for a key detection. Then since the memory of the terminal is not powered on, the external device cannot access the terminal profile information from the terminal in the power-off state. This limits the related art mobile terminal from providing an optimized quality of services to the user. This also does not help the external device in the process of initiating and implementing various services and operations for or with the mobile terminal.

DISCLOSURE OF INVENTION

Technical Solution

A technical goal of the present invention is to provide a mobile terminal and method for providing terminal related information to external devices/applications at any given time including a power-off state of the terminal.

Another technical goal of the present invention is to provide a mobile terminal and method that allows terminal related information (e.g., terminal profile information) to be stored in a dedicated part of an internal memory or other storage unit, which can be powered through a contactless module even in a power-off state of the terminal.

Another technical goal of the present invention is to provide a removable storage unit associated with a host device, wherein the storage unit includes a contactless module for powering a dedicated storage area in a power-off stage of the host device.

Another technical goal of the present invention is to provide a mobile terminal and method for supplying power to various storage units associated with the terminal in a power-off state of the terminal.

Another technical goal of the present invention is to provide a mobile terminal and method for selectively accessing applicable terminal related information from one of multiple storage units in a power-off state of the terminal.

Another technical goal of the present invention is to provide a mobile terminal and method for providing terminal related information, which address the limitations and disadvantages associated with the relate art.

Another technical goal of the present invention is to provide a mobile terminal and method for powering and accessing multiple storage units of the terminal according to an access rule set, in a power-off state of the terminal.

According to an aspect of the present invention, there is provided a mobile terminal for providing information related to the mobile terminal in a mobile terminal power-off state, the mobile terminal comprising: at least one storage unit; and a contactless controller configured to receive a request for the information related to the mobile terminal from a requesting device in the power-off state, to obtain the requested information from the at least one storage unit in the power-off state, and to transmit the obtained information to the requesting device in the power-off state.

According to another aspect of the present invention, there is provided a method for providing information related to the mobile terminal in a mobile terminal power-off state by using a contactless controller associated with the mobile terminal, the method comprising: receiving power through a wired-connected device, a contactless reader, or a battery of the mobile terminal; supplying the power to at least one storage unit associated with the mobile terminal in the power-off state; receiving a request for the information related to the mobile terminal from a requesting device through the contactless controller in the power-off state; obtaining the requested information from the at least one storage unit in the power-off state; and transmitting the obtained information to the requesting device in the power-off state.

According to another aspect of the present invention, there is provided a contactless controlling device configured to interact with a host device and to communicate with a contactless reader, for providing information related to the host device in a power-off state of the host device, the contactless controlling device comprising: a controller configured to receive a request for the information related to the host device from a requesting device in the power-off state of the host device, to obtain the requested information from at least one storage unit associated with the host device in the power-off state of the host device, and to transmit the obtained information to the requesting device in the power-off state of the host device.

Advantageous Effects

The present invention allows certain information such as terminal related information to be accessed from the mobile terminal (or other host device) by an external device in a power-off state of the mobile terminal (or the host device). Further, since a contactless module can be disposed in a removable storage unit (e.g., SD card, SIM card, etc.) of the mobile terminal, the same storage unit can be inserted into a terminal that does not have a contactless module, which renders the terminal to easily have the contactless module and functions of the invention. Moreover, since the terminal related information is stored in a dedicated part of the memory of the terminal or other storage unit, the stored information can be easily and quickly accessed and managed in the power-off state of the terminal.

MODE FOR THE INVENTION

Hereinafter, preferred embodiments of the present invention will be described in detail with reference to the accompanying drawings. The following embodiments should be considered in descriptive sense only and not for purpose of limitation.

According to embodiments, terminal related information includes any information or data associated with or relating to a terminal or host device such as a mobile terminal. As non-limiting examples, the terminal related information can include one or more of terminal profile information, terminal support information, terminal capability information, terminal state information, service information, network information, etc. As other non-limiting examples, the terminal related information can include one or more of the following information: availability of GSM/3GPP specific services (including, e.g., SMS download), availability of GSM/3GPP specific features (e.g., Call Control feature), availability of CAT and (U)SAT commands, availability of CAT and (U)SAT events, support of the terminal bearers (including Bluetooth, IrdA, etc.) and capability (e.g., number of ISO channels available), support of the terminal protocols (e.g., TCP, UDP, etc.), terminal capabilities (e.g., mark-up language support, display size, specific application/software applicability, terminal display strategy including scrolling, etc.), features supported by the terminal, etc.

According to embodiments, a mobile terminal can be, but is not limited to, a host device, a mobile phone, a smart phone device, a computer notebook, a handset, a user equipment, a mobile station, a pager, an MP3 player, a portable recording/reproducing device, a PDA, a GPS device, a Bluetooth device, etc.

According to embodiments, an external device is any device that can communicate with the mobile terminal or other host device for various services and operations. Examples of the external device include, but are not limited to, an MP3 player, a GPS receiver, a contactless reader (e.g., for reading prepaid cards, metro cards, etc.), another mobile terminal, a server, a network entity, etc.

According to embodiments, generally the mobile terminal (or host device) is either in a power-on state or a power-off state. The power-on state can mean the terminal is turned on, or is in an active or idle mode. The power-off state can mean the terminal is turned off, where the battery use may be activated. In the power-on state, power can be supplied to the terminal via its battery or power line (e.g., through an electric outlet connection).

Various embodiments of the invention will now be described relating to the power-off state of the mobile terminal. However, the invention is not limited thereto, and can be equally applicable to the power-on state of the mobile terminal, if desired. Further, if for some reason, the terminal can be in another state, other than the power-on and power-off states, then the invention is applicable to that state as well. Moreover, all features applicable to the mobile terminal (an example of a host device) are equally applicable to other host devices.

Figure 1:
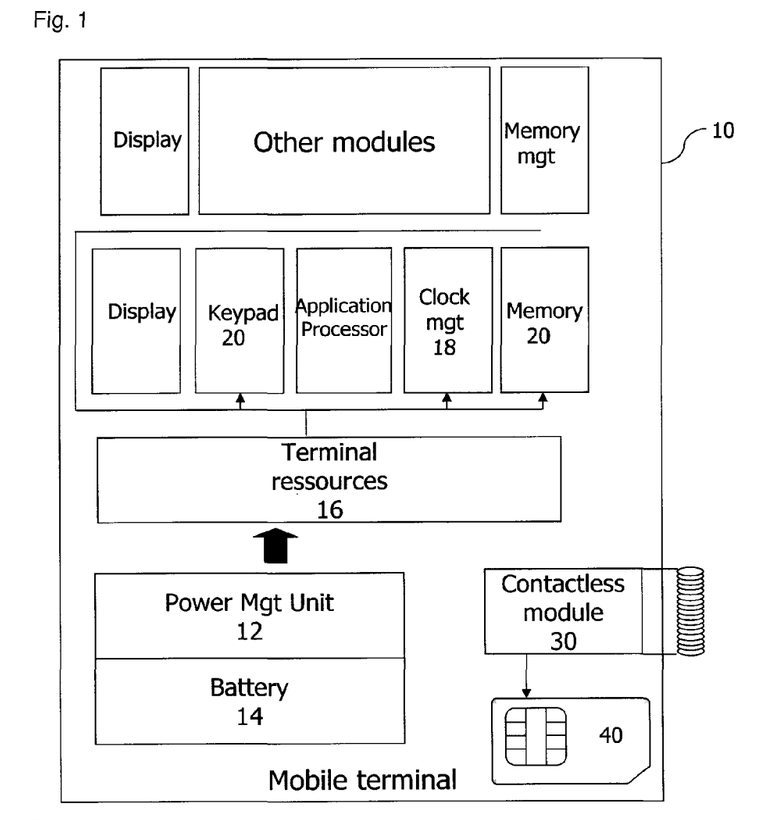
FIG. 1 is a block diagram illustrating a mobile terminal and its powering method according to an embodiment of the present invention.

FIG. 1 is a block diagram illustrating a mobile terminal and its powering method according to an embodiment of the present invention.

As shown in FIG. 1, a mobile terminal 10 includes a power management unit (PMU) 12 for managing how power is supplied to the various components of the terminal 10. The terminal 10 can include components including, but not limited to, a battery 14, terminal resources 16 (e.g., controllers, interfaces, etc.), a memory 20 such as an internal memory, a contactless module (contactless controller) 30 for contactlessly communicating with a contactless reader, a SIM (subscriber identification module) card 40, an input unit 20 such as a keypad, an output unit such as display(s), application processor(s), a clock management unit 18, a memory management unit, other storage units and modules, etc. All the components of the mobile terminal 10 are operatively coupled and configured.

Figure 2:
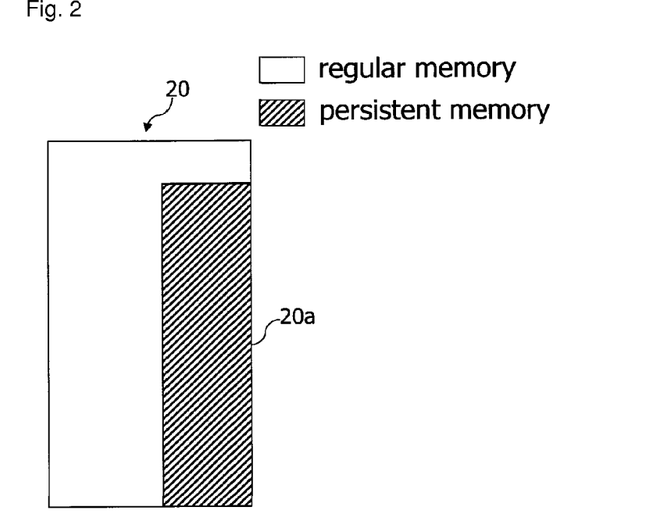
FIGS. 2 and 3 illustrate different examples of the structure of a memory usable in the mobile terminal according to an embodiment of the present invention.
Figure 3:
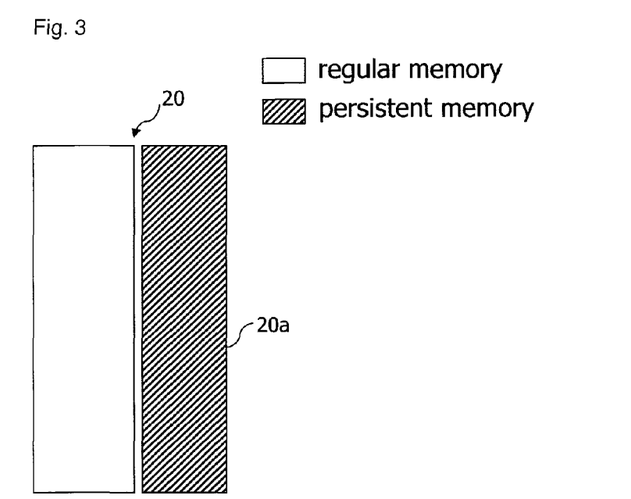

The memory 20 stores therein the terminal related information discussed above. For easy access and management and in order to reduce power required to activate the memory 20 for accessing the terminal related information, the terminal related information is preferably stored in a designated part of the memory 20, separated from other information and data stored in the memory 20. In one example as shown in FIG. 2, a dedicated area 20a (e.g., piece of hardware) of the memory 20 can be designated for storing therein the terminal related information. That is, the terminal related information can be stored in a persistent memory area as part of a memory module. In another example as shown in FIG. 3, the memory 20 can be divided into different units which may be physically separated, and the terminal related information can be stored in one 20a of the divided units of the memory 20. That is, the terminal related information can be stored in a persistent memory separated from a regular memory of a memory module. As a variation, a dedicated EEPROM or flash memory chip, as part of the memory 20, can store the terminal related information.

According to an embodiment, the terminal related information can be stored in other storage units associated with the mobile terminal 10. For example, the terminal related information can be stored in a smart card such as the SIM card 40, USIM, UICC, RUIM, CSIM, etc., or in a memory card such as a SD (Secure Digital) card, MMC (MultiMediaCard) card, etc. The smart card is generally a card having a processor to control, and can be inserted into the terminal. The memory card is generally a card having only a memory function (no controlling function), and can be inserted into the terminal. These cards are generally removable storage units. In such cases, the terminal related information can be stored in a dedicated part within the card.

Returning to FIG. 1, in the power-off state of the mobile terminal 10, power from the battery 14 is supplied to the applicable terminal resources 16 and the memory 20 having the terminal related information stored therein through the PMU 12. For example, in the power-off state of the mobile terminal 10, power may be supplied to only the dedicated part of the me memory 20 (and not the rest of the memory 20) where the terminal related information is stored, so as to reduce power required to access this information. Also, the battery power may be also supplied to the keypad 20 and clock management unit 18 for any key detection in the power-off state.

As a result, even in the power-off state of the mobile terminal, any external device can communicate with the mobile terminal (e.g., using the powered-on resources to access the terminal related information from the memory 20 or other storage unit if stored therein). Information on the location or address of the memory 20 where the terminal related information is located, may be stored in the mobile terminal, e.g., within the resources 16, in an index or other designated area of the memory 20, in the contactless module 30, etc.) so that the terminal related information can be easily accessed. Furthermore, because the terminal related information is separately stored in the dedicated area of the memory 20 or card, minimum or reduced power and time are needed to activate the dedicated area and to access the relevant information therefrom in the power-off state of the terminal.

On the other hand, in the power-on state, power from the battery 14 or a power line connected to an electric outlet can be supplied fully to the various components of the mobile terminal 10 under control of the PMU 12. In the alternative, the dedicated part of the memory 20 may be powered in the power-on state in the same manner as in the power-off state as discussed herein. And thus, the dedicated part of the memory 20 of the terminal 10, where the terminal related information is stored, can be powered and accessed at any time including the power-off state of the terminal 10.

Figure 4:
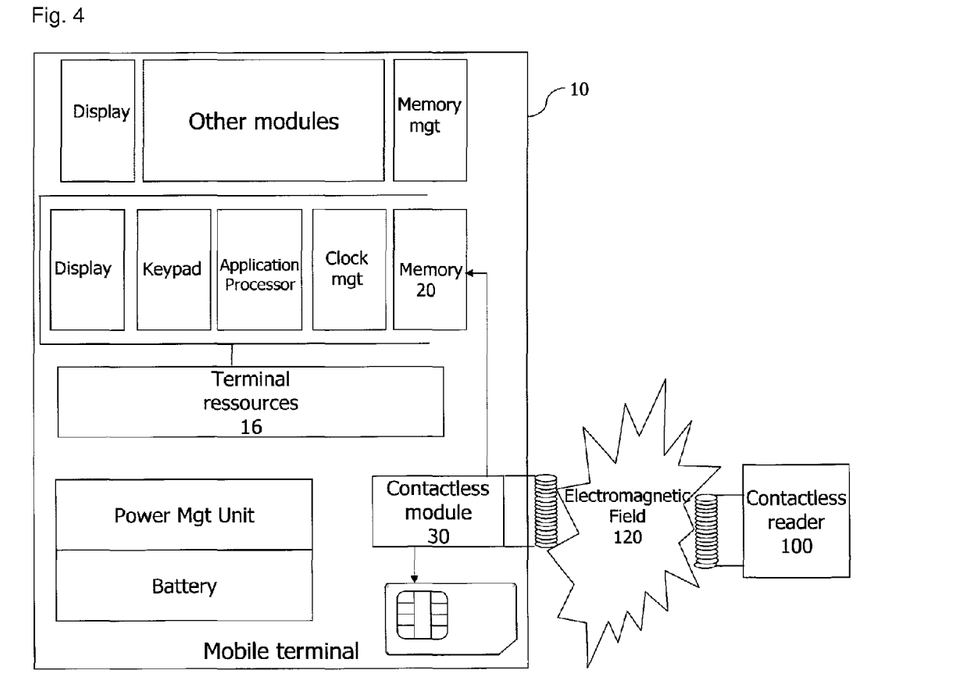
FIG. 4 is a block diagram illustrating a mobile terminal and its powering method according to an embodiment of the present invention.

FIG. 4 is a block diagram illustrating a mobile terminal and its powering method according to an embodiment of the present invention. The mobile terminal 10 of FIG. 4 is identical to the terminal 10 of FIG. 1, and thus includes the terminal related information stored in the dedicated location of the memory 20.

In the example of FIG. 4, in the power-off state of the mobile terminal 10, power to the memory 20 is provided through the contactless module 30 (contactless controller). The contactless module 30 is any known contactless module configured to communicate contactlessly with any known contactless reader. For example, the contactless module 30 contactlessly communicates with a contactless reader 100 using well known contactless communication methods, and thereby supplies power received from the contactless reader 100 in the form of electromagnetic power 120 to the dedicated part of the memory 20. An external device such as the contactless reader 100 can then access the terminal related information from the dedicated part of the memory 20.

For instance, the contactless reader 100 (acting as an external device) can send a request for the terminal related information to the contactless module 30 in the power-off state of the terminal 10. In response to this request from the contactless reader 100, the contactless module 30 can power the dedicated part of the memory 20, access the terminal related information from the activated dedicated part of the memory 20, and contactlessly supply the accessed information to the contactless reader 100. In another example, the contactless module 30 can supply the electromagnetic power to other components as needed in addition to the memory 20. For example, it may supply the electromagnetic power to the terminal resources 16 (e.g., limited controller) for communicating with the external device and accessing and supplying the requested terminal related information to the external device.

Figure 5:
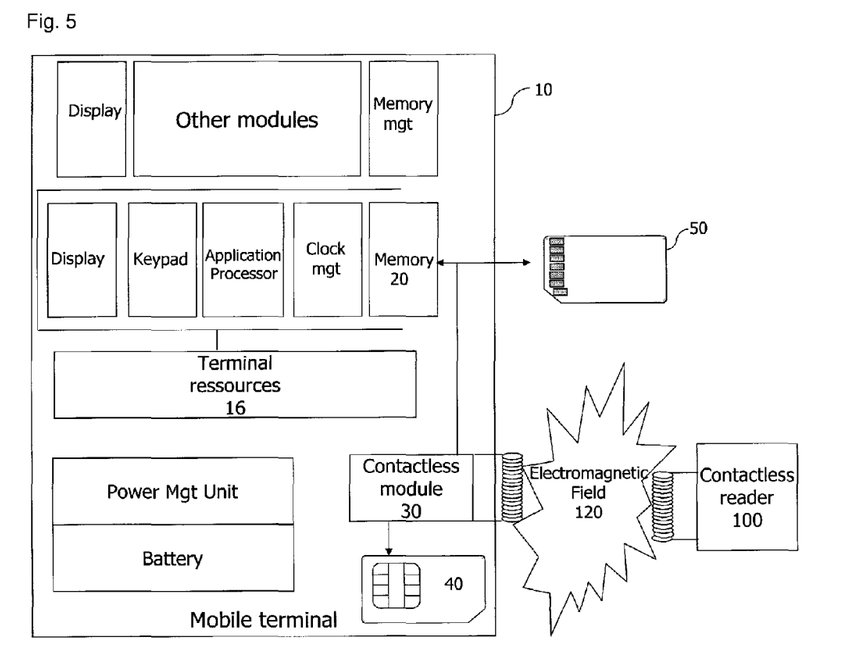
FIG. 5 is a block diagram illustrating a mobile terminal and its powering method according to an embodiment of the present invention.

FIG. 5 is a block diagram illustrating a mobile terminal and its powering method according to an embodiment of the present invention. The example of FIG. 5 includes and illustrates the same scenario and inventive features as the example of FIG. 4, but further illustrates that the contactless module 30 can supply power to the SIM card 40 and/or a SD card 50 associated with the terminal in the power-off state of the terminal 10.

In the example of FIG. 5, the terminal related information may be stored in the dedicated part of the memory 20, which is then electromagnetically powered on by the contactless module 30 in the power-off state of the terminal as discussed in connection with FIG. 4. In addition or in the alternative, the terminal related information or part of the terminal related information or other information may be stored in the SIM card 40 and/or SD card 50. If so, in the power-off state of the terminal 10, the contactless module 30 supplies electromagnetic power 120 to the SIM card 40 and/or SD card 50 (or certain dedicated parts thereof) so that the stored information may be accessed by the contactless reader 100 or other external device in the power-off state of the terminal.

Figure 6:
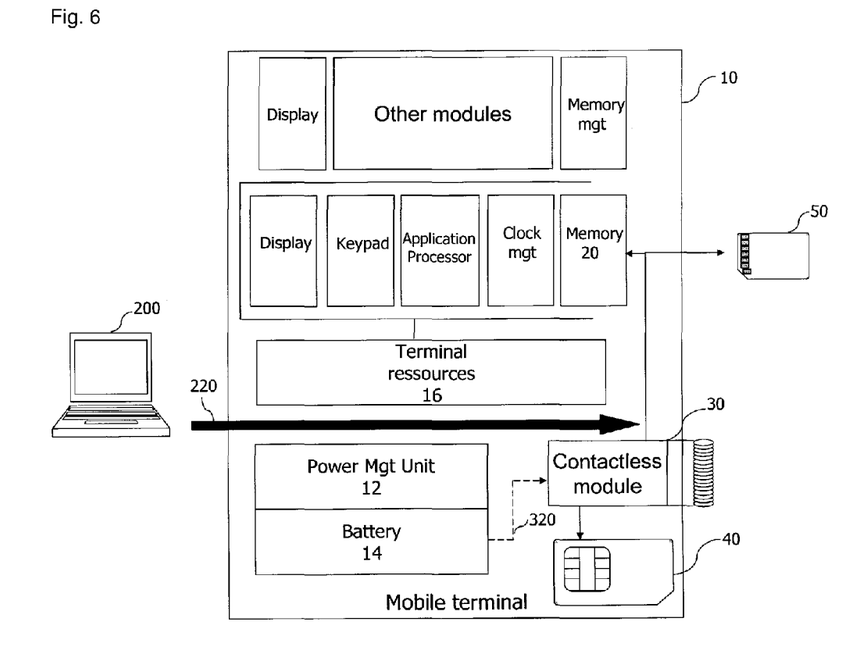
FIG. 6 is a block diagram illustrating a mobile terminal and its powering method according to an embodiment of the present invention.

FIG. 6 is a block diagram illustrating a mobile terminal and its powering method according to an embodiment of the present invention. The example of FIG. 6 includes and illustrates the same scenario and inventive features as the example of FIG. 5, except that the dedicated part of the memory 20, SIM card 40, and/or SD card 50 is powered on by a wired-connected device 200 in the power-off state of the terminal 10. The wire-connected device can be any self powered device, e.g., a computer notebook, a GPS device, etc. For example, a GPS device (200) may be connected to the terminal 10 through a wireline (e.g., USB), and can supply electric current 220 through the wireline to the memory 20, SIM card 40, and/or SD card 50 in the power-off state of the terminal 10. This may occur by supplying the electric current 220 to the contactless module 30 which in turn transfers the current 220 to the storage unit(s) such as the memory 20, SIM card 40, and/or SD card 50 in the power-off state of the terminal. If needed, the contactless module 30 may also transfer the power 220 to the terminal resources 16. As a result, the terminal related information or any other information stored within the powered-on storage unit can be accessed by the GPS device (200) or other external device.

As an alternative, in FIG. 6, in the power-off state of the terminal 10, the battery 14 may supply power 320 to the contactless module 30, which in turn may transfer the power 320 to a desired device, e.g., the dedicated part of the memory 20, the SIM card 40, and/or the SD card 50. As a result, the terminal related information or other information may be accessed in the power-off state of the terminal 10.

According to an embodiment, the mobile terminal 10 can be configured to update the terminal related information as needed or regularly so that most current information is stored in the terminal 10. A user, network operator, system administrator, the terminal 10, or other entity may set and control settings associated with such updating.

Further, the terminal related information can be stored in different places such as the memory 20 (or any other dedicated location within the terminal 10), a smart card (e.g., SIM card 40) associated with the terminal 10, or a memory card (e.g., SD card 50) associated with the terminal 10. Where to store the terminal related information can be decided by the user, network operator, system administrator, the terminal itself, or other entity.

Given that the terminal related information may be stored in one of possible locations, the mobile terminal 10 can be configured to check the possible locations according priority information. The priority information can be any information relied on by the terminal 10 for checking the possible locations of the requested information. The priority information for example can include an access rule set (e.g., order of access, etc.). For example, the contactless module 30 (e.g., contactless function therein) may check the possible locations in a particular order according to the access rule set. The priority information such as the access rule set can be set up by the operator/mobile chipset manufacturer, the user of the terminal, or other entity.

Figure 7:
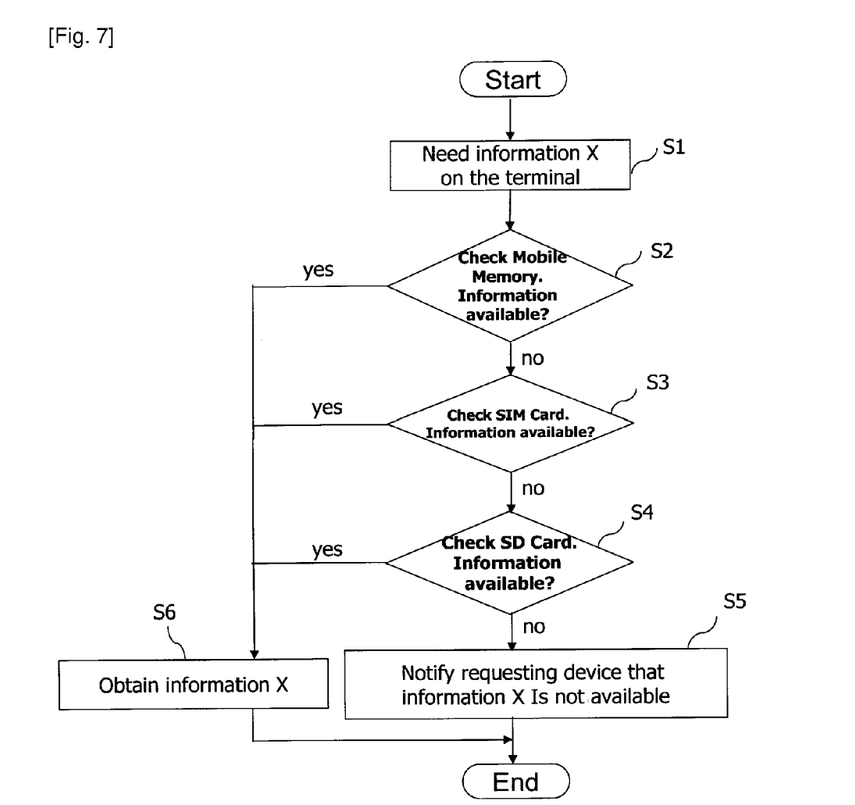
FIG. 7 is a flowchart illustrating a method for checking a plurality of storage units associated with a terminal for requested information according to an embodiment of the present invention.

FIG. 7 is a flowchart illustrating a method for checking a plurality of storage units associated with a terminal for requested information according to an embodiment of the present invention. In this example, according to the priority information, the storage units such as the memory 20, the SIM card 40 and the SD card 50 are checked in that order for information (e.g., information X) requested by an external device, in the power-off state of the terminal 10. These storage units may be powered-on in the power-off state of the terminal 10 according to various powering methods discussed in the present disclosure. As a variation, these storage units may be selectively powered-on in the power-off state of the terminal 10 as discussed in the present disclosure, only one at a time when that storage unit is checked for the requested information.

The method of FIG. 7 can be implemented in the terminals using the powering methods of FIGS. 1-5, and is preferably performed in the power-off state of the terminal.

Referring to FIG. 7, in the power-off state of the mobile terminal 10, when an external device requests for certain information X such as the terminal related information in step S1, the mobile terminal 10 (e.g., the contactless module 30 or powered-on resource 16) checks the dedicated part of the memory 20 first according to the priority information, in step S2. At this time, if the dedicated part of the memory 20 is not activated, then power is supplied to the dedicated part of the memory 20 using any powering method of the invention and then is checked to see if the requested information is present or available in the memory 20.

If the requested information is present or available in the memory 20, then the mobile terminal 10 (e.g., the contactless module 30 or the resource 16) accesses and provides the requested information to the requesting external device in step S6.

On the other hand, if step S2 indicates that the requested information is not present or available in the memory 20, then the mobile terminal 10 (e.g., the contactless module 30 or the powered-on resource 16) checks next the SIM card 40 according to the priority information in step S3. If the requested information is found in the SIM card 40, then the requested information is supplied to the requested external device in step S6.

However, if step S3 indicates that the requested information is not present or available in the SIM card 40, then the mobile terminal 10 (e.g., the contactless module 30 or other powered-on resource 16) checks next the SD card 50 according to the priority information in step S4. If the requested information is found in the SD card 50, then the requested information is supplied to the requested external device in step S6.

However, if step S4 indicates that the requested information is not present or available in the SD card 50, then the mobile terminal 10 (e.g., the contactless module 30 or other powered-on resource 16) notifies the requesting external device that the requested information is not available in step S5.

Accordingly, the present invention provides a mobile terminal having a function of processing and routing a request for specific information through possible valid locations in a certain order or according to an access rule set in the power-off state of the mobile terminal. This allows an optimized manner of searching for and obtaining the requested information by an external device in the power-off state of the mobile terminal.

Figure 8:
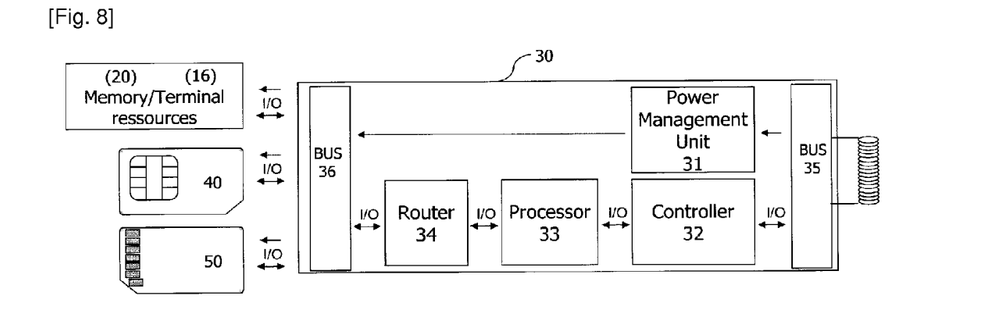
FIG. 8 is a block diagram illustrating a contactless module and multiple storage units for communicating with the contactless module according to an embodiment of the present invention.

FIG. 8 is a block diagram illustrating a contactless module and multiple storage units for communicating with the contactless module according to an embodiment of the present invention. The method of FIG. 7 and the powering methods of FIGS. 1-5 can be implemented using the contactless module 30 of FIG. 8.

As shown in FIG. 8, the contactless module 30 of the mobile terminal 10 can include a power management unit 31, a controller (e.g., digital signal processor (DSP)) 32, a processor 33, a router 34, one or more buses 35, 36 for data and power communication, etc. The controller 32 can communicate with the other components of the terminal and controls the operations of the contactless module 30. All the components of the contactless module 30 are operatively coupled and configured.

In the power-off state of the terminal 10, when the contactless module 30 receives power through the contactless reader 100, the wired-connected device 200, or the battery 14 as discussed above, the power management unit 31 can transfer the received power to the terminal resource 16, the memory 20, the SIM card 40, and/or the SD card 50. The power management unit 31 can also supply the received power to other components of the contactless module 30 in the power-off state of the terminal.

If a request for certain information (e.g., terminal related information) from the contactless reader 100 or other external device is received, the controller 32 processes it in the power-off state of the terminal. The router 34 may store therein the priority information (e.g., access rule set) and routes the request according to the priority information to the memory 20 (through the terminal resources 16), the SIM card 40, and the SD card 50 in any designated order or manner, as illustrated in the method of FIG. 7 (only a non-limiting example).

Figure 9:
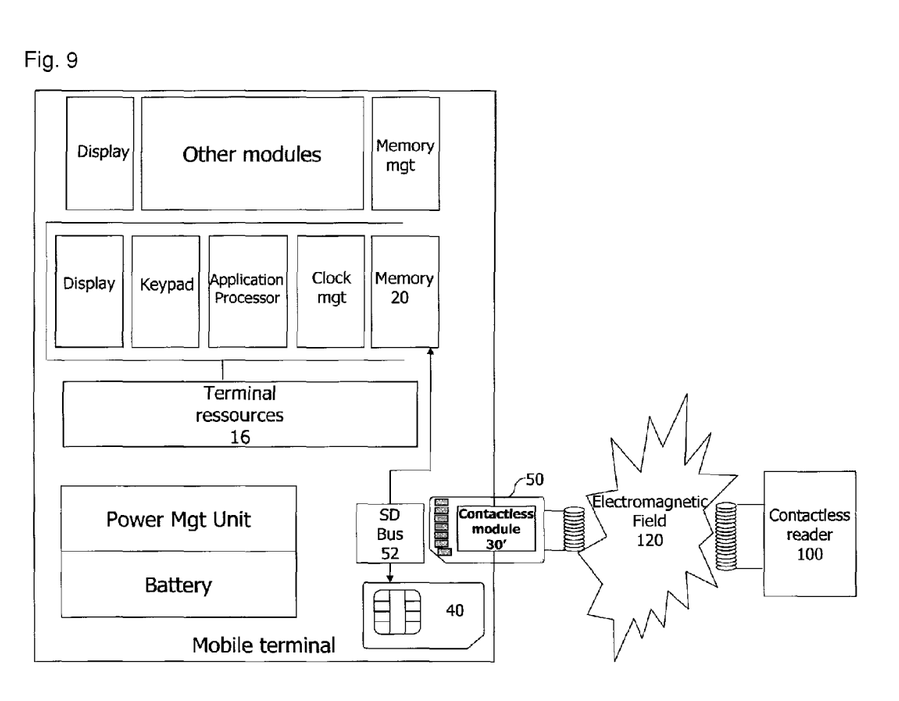
FIG. 9 is a block diagram illustrating a mobile terminal having a contactless module residing in its removable storage unit according to an embodiment of the present invention.

FIG. 9 is a block diagram illustrating a mobile terminal having a contactless module residing in its removable storage unit according to an embodiment of the present invention. In the example of FIG. 9, the contactless module resides in an SD card associated with the mobile terminal. However, the contactless module can reside in the SIM card 40 or in any other type of storage unit associated with the terminal.

As shown in FIG. 9, the mobile terminal 10 includes the SD card 50, a SD bus 52, and a contactless module 30 included in the SD card 50. The contactless module 30 is the same as the contactless module 30 discussed above according to various examples, but is provided in the SD card 50 which is removable.

In the power-off state of the terminal 10, the power management unit 31 of the contactless module 30 can transfer the power received according to the various powering methods discussed above to the memory 20 and/or the SIM card 40 through the SD bus 52. Further, in the power-off state of the terminal 10, the power management unit 31 of the contactless module 30 can supply the power to other components of the contactless module 30 as well as other components of the SD card 50.

As such, any requested information such as the terminal related information can be accessed from the mobile terminal 10 by a requesting external device in the power-off state of the mobile terminal. Further, since the contactless module can be disposed in a removable storage unit (e.g., SD card, SIM card, etc.), such storage unit can be inserted into a different terminal or other host device that does not have a contactless module, which renders that host device to easily have the contactless module and functions therein. Thus, any host device can receive contactless services through the use of the removable storage unit having the contactless module therein.

In the above descriptions, accessing the terminal related information by an external device in the power-off state of the mobile terminal is discussed. However, the invention is not limited to such information, and can be applied to access any other information or data by the external device in the power-off state of the mobile terminal. Further, as discussed above, the memory 20, the SIM card 40, and the SD card 50 are considered merely as examples of storage units associated with the terminal. The terminal can include other types of storage units, and can have any number of the storage units.

Moreover, according to the present invention, different types or pieces of the terminal related information or other information may be respectively stored in the storage units associated with the mobile terminal. For instance, the SIM card can store terminal capability information pertaining to a particular application such as a banking application, whereas the internal memory of the terminal can store terminal profile information pertaining to an MP3 player application. In the power-off state of the terminal, depending on the applicability (e.g., depending on the name of the application, external device, etc.), the contactless module may select to access only one of the storage units to access the appropriate terminal related information. As a variation, the contactless module may check the storage units according to the priority information.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

The present invention may be applicable to accessing information from a mobile terminal or other host device in a power-off state of the mobile terminal or host device.

The invention claimed is:

1. A mobile terminal for providing information related to the mobile terminal in a mobile terminal power-off state, the mobile terminal comprising:
   at least one storage unit; and
   a contactless controller configured to receive a request for the information related to the mobile terminal from a requesting device in the power-off state, to obtain the requested information from the at least one storage unit in the power-off state, and to transmit the obtained information to the requesting device in the power-off state,
   wherein the information related to the mobile terminal includes mobile terminal capability information indicating a mark-up language support, a size of display, an applicability of specific software, and a terminal display strategy,
   wherein the information related to the mobile terminal further includes mobile terminal profile information that is used to determine whether the mobile terminal has the necessary capabilities to accommodate a specific operation,
   wherein the at least one storage unit includes at least two of the following storage units: an internal memory of the mobile terminal, a smart card, and a memory card,
   wherein the contactless controller resides in the smart card or the memory card,
   wherein the contactless controller is further configured to check priority information indicating an access rule set of the at least two storage units, and to access the at least two storage units according to the access rule set to obtain the requested information, and
   wherein the access rule set indicates possible locations in a particular order for the requested information, and the access rule set is set by a user.

2. The mobile terminal of claim 1, wherein the contactless controller is configured to receive power through a wired-connected device, a contactless reader, or a battery of the mobile terminal, and to supply the power to the at least two storage units in the power-off state.

3. The mobile terminal of claim 1, wherein the information related to the mobile terminal is stored in a dedicated part of one of the at least two storage units.

4. A method for providing information related to the mobile terminal in a mobile terminal power-off state by using a contactless controller associated with the mobile terminal, the method comprising:
   receiving power through a wired-connected device, a contactless reader, or a battery of the mobile terminal;
   supplying the power to at least one storage unit associated with the mobile terminal in the power-off state;
   receiving a request for the information related to the mobile terminal from a requesting device through the contactless controller in the power-off state;
   obtaining, by the contactless controller, the requested information from the at least one storage unit in the power-off state; and transmitting, by the contactless controller, the obtained information to the requesting device in the power-off state, wherein the information related to the mobile terminal includes mobile terminal capability information indicating a mark-up language support, a size of display, an applicability of specific software, and a terminal display strategy, wherein the information related to the mobile terminal further includes mobile terminal profile information that is used to determine whether the mobile terminal has the necessary capabilities to accommodate a specific operation, wherein the at least one storage unit includes at least two of the following storage units: an internal memory of the mobile terminal, a smart card, and a memory card, wherein the contactless controller resides in the smart card or the memory card, wherein the step of obtaining the requested information includes checking, by the contactless controller, priority information indicating an access rule set of the at least two storage units, and accessing the at least two storage units according to the access rule set to obtain the requested information, and wherein the access rule set indicates possible locations in a particular order for the requested information, and the access rule set is set by a user.

5. A contactless controlling device configured to interact with a host device and to communicate with a contactless reader, for providing information related to the host device in a power-off state of the host device, the contactless controlling device comprising:

a controller configured to receive a request for the information related to the host device from a requesting device in the power-off state of the host device, to obtain the requested information from at least one storage unit associated with the host device in the power-off state of the host device, and to transmit the obtained information to the requesting device in the power-off state of the host device, wherein the information related to the mobile terminal includes mobile terminal capability information indicating a mark-up language support, a size of display, an applicability of specific software, and a terminal display strategy, wherein the information related to the mobile terminal further includes mobile terminal profile information that is used to determine whether the mobile terminal has the necessary capabilities to accommodate a specific operation, wherein the at least one storage unit includes at least two of the following storage units: an internal memory of the mobile terminal, a smart card, and a memory card, wherein the controller resides in the smart card or the memory card, wherein the controller is further configured to check priority information indicating an access rule set of the at least two storage units, and to access the at least two storage units according to the access rule set to obtain the requested information, and wherein the access rule set indicates possible locations in a particular order for the requested information, and the access rule set is set by a user.

\* \* \* \* \*